(12) United States Patent
Doblmayr et al.

(10) Patent No.: US 7,337,409 B2
(45) Date of Patent: Feb. 26, 2008

(54) CUSTOMIZABLE DRAG AND DROP FOR INDUSTRIAL SOFTWARE APPLICATIONS

(75) Inventors: Stefan Doblmayr, Erlangen (DE); Elmar Thurner, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 788 days.

(21) Appl. No.: 10/254,355

(22) Filed: Sep. 25, 2002

(65) Prior Publication Data
US 2004/0056896 A1 Mar. 25, 2004

(51) Int. Cl.
G06F 17/00 (2006.01)
G09G 5/00 (2006.01)

(52) U.S. Cl. .................................. 715/769; 715/805

(58) Field of Classification Search .............. 715/769, 715/805, 804, 800, 801, 823, 810, 808, 809, 715/771, 811, 751, 752; 709/220
See application file for complete search history.

(56) References Cited

U.S. PATENT DOCUMENTS

| | | | | |
|---|---|---|---|---|
| 5,742,286 A | * | 4/1998 | Kung et al. | 715/839 |
| 5,884,298 A | * | 3/1999 | Smith et al. | 707/2 |
| 5,911,066 A | * | 6/1999 | Williams et al. | 719/310 |
| 5,923,327 A | | 7/1999 | Smith et al. | 345/341 |
| 5,953,532 A | | 9/1999 | Lochbaum | 395/712 |
| 5,995,106 A | | 11/1999 | Naughton et al. | 345/357 |
| 6,002,402 A | * | 12/1999 | Schacher | 715/810 |
| 6,025,844 A | | 2/2000 | Parsons | 345/357 |
| 6,727,919 B1 | * | 4/2004 | Reder et al. | 715/810 |
| RE38,883 E | * | 11/2005 | Wyard | 715/769 |
| 6,993,712 B2 | * | 1/2006 | Ramachandran et al. | 715/513 |
| 7,076,453 B2 | * | 7/2006 | Jammes et al. | 705/26 |
| 7,089,256 B2 | * | 8/2006 | Smialek | 707/102 |
| 2002/0016803 A1 | * | 2/2002 | Ryan et al. | 707/527 |
| 2002/0059288 A1 | | 5/2002 | Yagi et al. | 707/102 |
| 2003/0076358 A1 | * | 4/2003 | Nakajima et al. | 345/765 |
| 2004/0098349 A1 | * | 5/2004 | Tolson | 705/64 |
| 2004/0153530 A1 | * | 8/2004 | Machida | 709/220 |
| 2006/0053407 A1 | * | 3/2006 | Kodosky et al. | 717/105 |
| 2006/0117264 A1 | * | 6/2006 | Beaton et al. | 715/751 |

OTHER PUBLICATIONS

PCT International Search Report for International Application No. PCT/EP03/10174, 2 pages.

* cited by examiner

*Primary Examiner*—Steven Sax
(74) *Attorney, Agent, or Firm*—Baker Botts L.L.P.

(57) ABSTRACT

Customizable Drag & Drop enables easy activation of user defined or project specific functions concerning two related objects: A user interface graphically displays objects of a particular module. An extending function extends the drag and drop operation to allow the user to define a new set of semantics that is applied when a drag and drop operation is executed. In this way communication can be established using Customizable Drag & Drop extended by a user defined function. Also definition and modification of the deployment of an industrial automation system and hyperlinking of objects in manufacturing execution systems is achieved by Customizable Drag & Drop.

14 Claims, 5 Drawing Sheets

Fig. 4b

CUSTOMIZABLE DRAG AND DROP FOR INDUSTRIAL SOFTWARE APPLICATIONS

BACKGROUND

1. Field of the Invention

The present invention relates to a Drag & Drop, and, more particularly, to enabling and extending a Functionality of a Drag & Drop Procedure, the application of which being particularly applicable to a Framework.

2. Related Information

In Commercial Software Applications, it is often the case that Functions need to be incorporated into new applications. In the past, this was accomplished by creating the code from scratch and connecting it to the Commercial Application. As Systems expanded, so did the need for programming code. In a short time, the amount of programming required to support a System was obviously too burdensome. Programmers often found themselves writing the same, or similar, code for different applications, literally recreating the wheel each time.

Object Code Programming was supposed to resolve the problem of rewriting code by providing reusable Objects. However, reusing objects still requires a certain amount of programming. For one thing, the Object needs to be imported and associated to the new application. For another, the Object invariably requires modifications to be compatible with new applications. In some respects, the programming required to incorporate new Objects poses as many challenges as writing the code from scratch. Interface and protocol issues have caused the creation of a whole new generation of programmers, called Network Analysts. As a result, the overall number of System Personnel for Systems has exploded in recent years.

Moreover, User's today of Commercial Software are accustomed to interfacing to Systems using a Graphical User Interface (GUI). Indeed, Systems today are almost entirely based around the GUI. It is a step backwards to require User's to leave the GUI environment and reprogram the Function manually.

This is particularly true in Industrial Applications, where a failure could result in the shut off of an entire Factory, such networks require almost constant supervision. With literally myriads of Systems connected to an Industrial Network, in order to meet the challenge of such a daunting task, User's are equipped with specialized Industrial Network GUIs, such as the Human Machine Interface (HMI). Even with all that technology support, User's are still required to make manual programming adjustments to their applications to incorporate new Functions.

What is needed, therefore, is a Method, System and Apparatus for enabling a User to simply and efficiently incorporate Functionality from one application to another, particularly in an Industrial Network.

OBJECTS & SUMMARY OF THE INVENTION

It is an object of the present invention to provide extended Functionality to a Drag & Drop Operation.

It is another object of the present invention to apply extended Functionality of a Drag & Drop Operation on Objects.

It is another object of the present invention to apply extended Functionality of a Drag & Drop Operation on Objects in a Framework.

It is another object of the present invention to apply extended Functionality of a Drag & Drop Operation on Objects in an Industrial Framework.

In accordance with the objects of the present invention, there is provided a mechanism for making user defined or project specific functions to extend semantics for a drag and drop operation. A user interface graphically displays objects of a particular module. An extending function extends the drag and drop operation to allow the user to define a new set of semantics that is applied when a drag and drop operation is executed.

In another aspect of the invention, there is provided a method of establishing communication using an extended graphical user interface function. The first step is to extend the functionality of a graphical user interface operation to include objects that establish a communication between external servers of a Framework. The next step is to execute the extended functionality in response to a graphical user interface operation.

BRIEF DESCRIPTION OF THE DRAWINGS

The several drawings shall be described in more detail, wherein like reference numerals refer to same or similar elements.

DETAILED DESCRIPTION OF THE PREFERRED EMBODIMENTS

Figure 1:
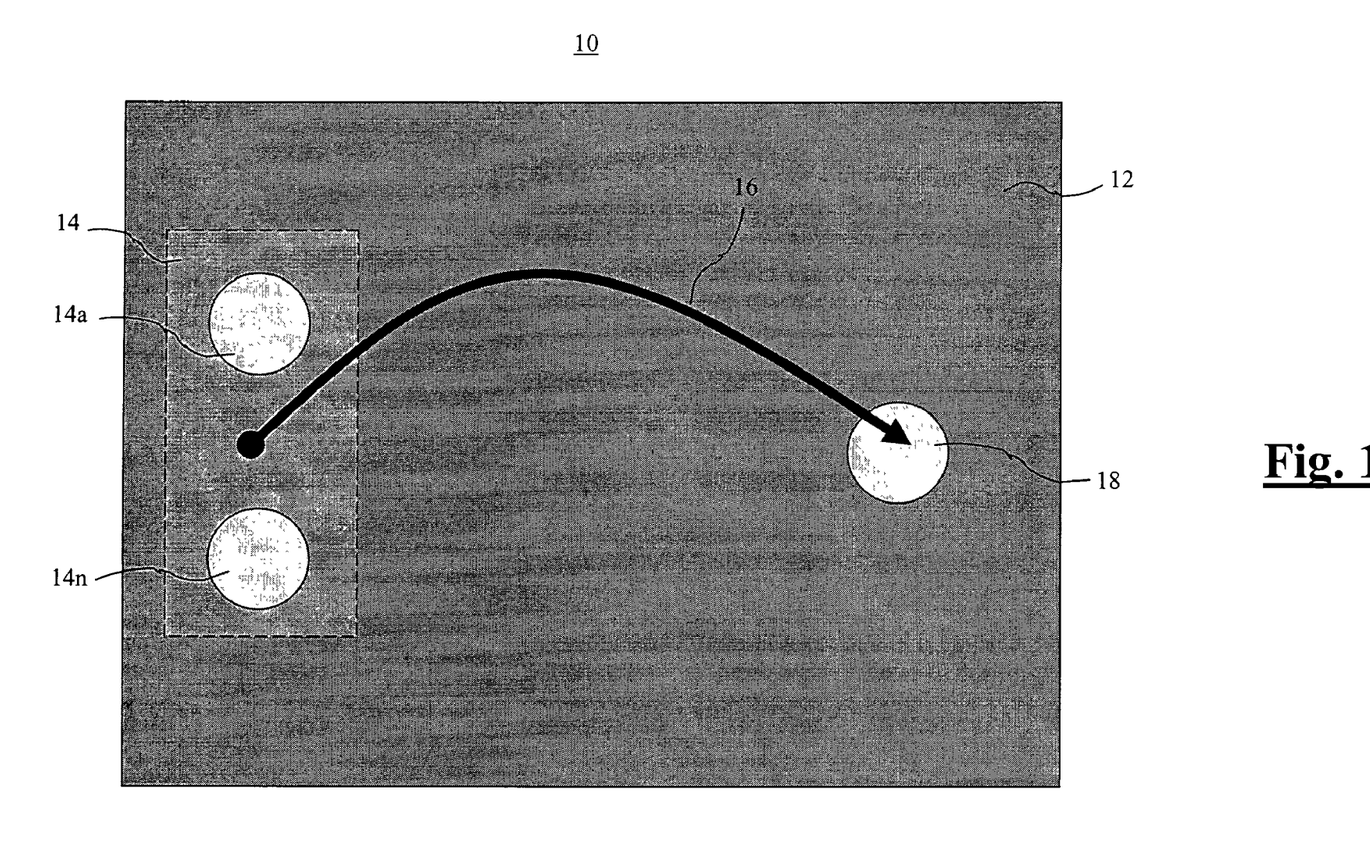
FIG. 1 is a schematic diagram of a Drag & Drop Operation.

The basic Drag & Drop Operation 10 is illustrated in FIG. 1. Briefly, a Drag & Drop, in terms of Graphical User Interfaces (GUIs), refers to moving an icon or other image on a display screen. Usually, the object is selected using a cursor, or pointer, controlled by a mouse button by "clicking" on the object. The object is moved, or "dragged" across the display screen by moving the mouse while keeping the mouse button pressed down. When the mouse button is released the data is "dropped" at that location.

In more technical terms, a Drag and Drop is a data transfer Application Program Interface (API) that allows the user to manipulate the graphical environment 12, and therefore, the underlying Applications associated with the graphical objects. With such a GUI operation, it is very practical to move objects within the environment. In many applications, for example, blocks of text may be selected by positioning the pointer at an end-point of the block and then dragging the pointer over the block. The highlighted material can then be copied or cut and moved.

The present invention of FIG. 1 provides a graphical based editor within an environment 12. An application, 14 includes one or more objects 14a . . . n. In operation, the user selects a source object 14a from, for example, the application, using the Drag & Drop 16 procedure already described. The source object 14a is dragged across the GUI to a target object 18.

While various aspects of a Drag & Drop procedure are defined, herein, it will be appreciated that the invention is not so limited by the specific terms, but encompasses equivalents of the various components. An icon refers to a small picture, or graphic, that represents an object or program. Any item can be individually selected and manipulated. This can include shapes and pictures that appear on a display screen as well as less tangible software entities. In object-oriented programming, for example, an object is a self-contained entity that consists of both data and procedures to manipulate the data.

In the present invention, reference is made to a mouse. A mouse is a device that controls the movement of the cursor or pointer on a display screen. As the mouse is moved, the pointer on the display screen moves in the same direction. The invention encompasses various types of mice, as well as their equivalents. There are mechanical mice with a rubber or metal ball on its underside whose sense is detected as it rolls with respect to sensors. Optomechanical mice are similar to mechanical mice, but use optical sensors to detect the motion and sense of the ball. Of course, the present invention is not limited to the use of a mouse but encompasses any means by which objects can be Dragged and Dropped.

There is also made reference to a GUI. In more detail, a GUI is a program interface that takes advantage of the computer's graphics capabilities to make the program easier to use. In general, GUIs feature the following basic components: A pointer, basically a graphic symbol, that appears on the display screen and that is moved to select objects and commands; A pointing device, such as a mouse or trackball, that enables you to select objects on the display screen; icons, small pictures that represent commands, files, or windows; a desktop, an area on the display screen, where icons are grouped which represent real objects on a real desktop; one or more windows, which are divisions of a screen which can run different programs or display different files; and a menu that allow the user to execute commands by selecting a choice from a menu.

A GUI does not merely display visual components, it allows the User to manipulate the objects in the underlying environment. With a GUI, for example, it is easier to move data from one application to another. A true GUI includes standard formats for representing text and graphics. Because the formats are well-defined, different programs that run under a common GUI can share data. This makes it possible, for example, to copy a graph created by a spreadsheet program into a document created by a word processor. Of course, this is merely an example and the present invention is not limited specifically to GUIs.

Figure 2:
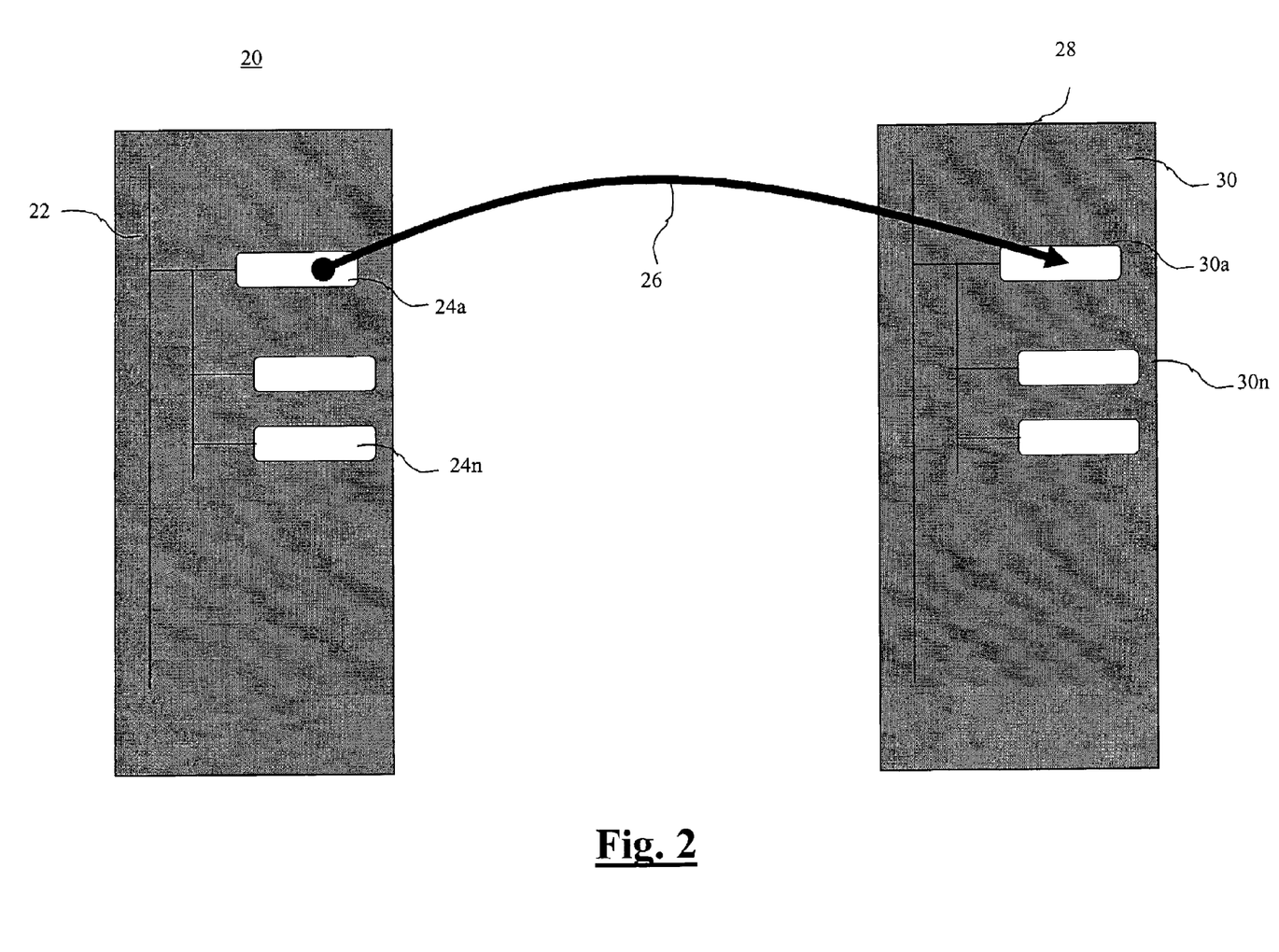
FIG. 2 is a schematic diagram of a Drag & Drop Operation within tree-representations of objects.

The present invention capitalizes on the flexibility of the GUI by extending the functionality of a Drag & Drop Operation. In this manner, the present invention is capable of performing configured, user-defined, and even possibly complex associative/relational operations. As shown in FIG. 2, for example, there is provided an hierarchy-based editor for dragging and dropping functionality between objects in an hierarchical tree. In a first window 20, there is a hierarchical tree 22 of objects 24*a* . . . *n*. A drag source object(s) 24*a* in selected to be dragged by a Drag & Drop Operation 26 to another window 28 having an hierarchical tree 30 of objects 32 dragged onto a target object(s) 32*a*. In other words, the drag and drop of the present invention performs a customized structural synchronization of hierarchical objects in different applications. The structural synchronization is a user defined function which can be added at runtime and selected after drop immediately before paste.

Figure 3:
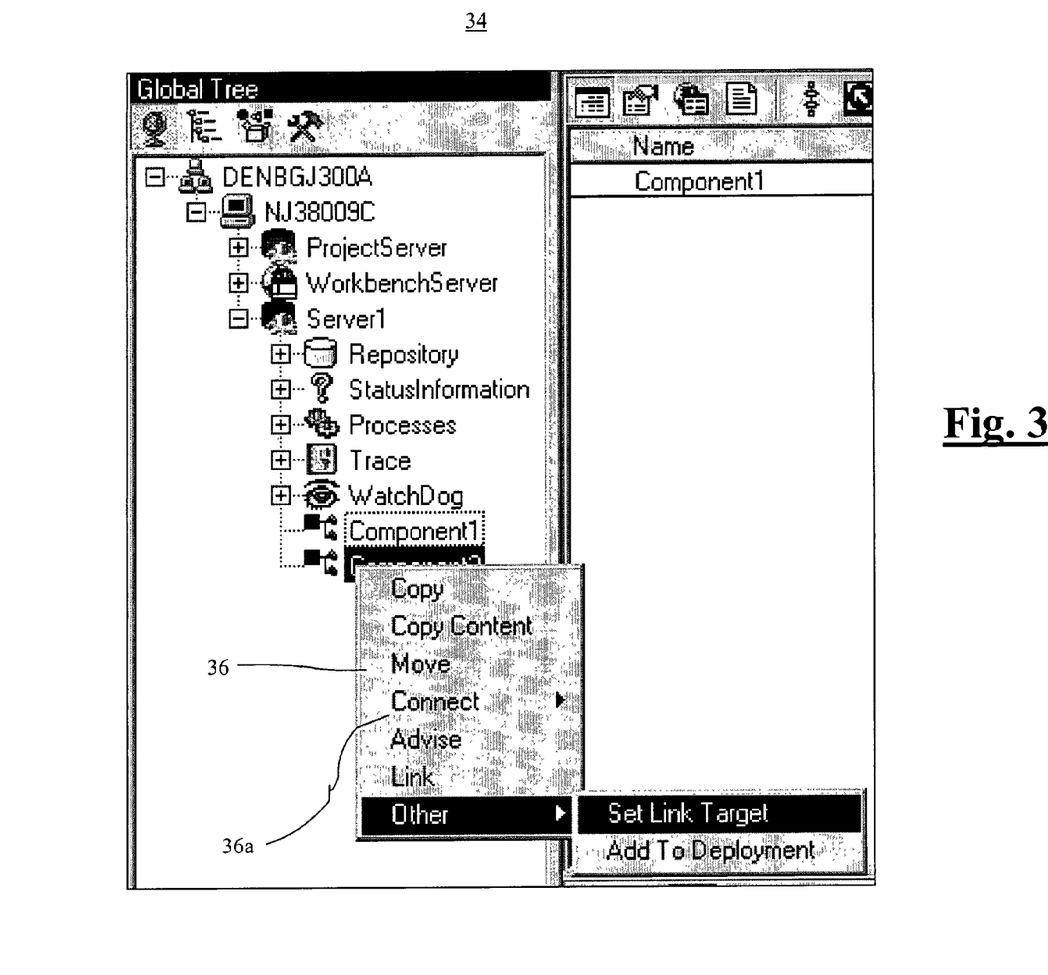
FIG. 3 is a screen shot illustrating the selection of specific functionality immediately before drag and/or before drop of an object during the Drag & Drop Operation.

FIG. 3 is a screen shot 34 of the present invention in action. The figure exemplifies how the functionality of the Drag & Drop is extended. According to the present invention, a Drag and Drop Functionality has been activated via which Component1 has been dragged and dropped on Component2. Upon drop a popup menu 36 has appeared that offers the extended user-defined Function(s) 36*a*. As shown, the Drag & Drop extended functions include Copy Content, Connect, Advise, Link, and other, such as Set Link Target and Add To Deployment. Also standard functions for drag and drop such as copy and move had been added to this popup menu. Of course, the present invention is not limited to any specific function(s) listed and may include, in addition or otherwise, other user-defined functions.

In one aspect, the present invention provides communication between Objects, or applications. In the Figure shown, there is provided an extend functionality to set the link target. When this extended function is selected before drop on target object, the link for the target is set, thereby establishing communication between the source and the target.

A working example of a Drag and Drop operation in a Windows™ environment is given in the attached Appendix. Here, now, will be described each of the events. There are two terms associated with the drag-and-drop operation, source and target. So, if dragging a folder into the Recycle Bin, the folder would be the source and the Recycle Bin would be the target. All the events associated with drag-and-drop operations occur in a sequential manner, all the event handlers are listed below.

First, the drag operation will be described. The ondragstart (source event) fires on the source object when the user starts to drag a text selection or selected object. This is the FIRST event to fire when initiating a drag operation. The ondrag (source event) Fires on the source object continuously while it is being dragged. It fires directly after the ondragstart event and will continue to fire until the ondragend event handler is triggered. The ondragenter (target event) fires when the source is dragged over a valid drop target object. The drop target may be in another browser window. The ondragover (target event) fires on the target element continuously while the user drags the object over a valid drop target. The ondrop (target event) fires on the target element when the user releases the mouse button over a valid drop target. The ondragleave (target event) fires if the user drags an object over a valid drop target and then out of the valid drop target. The ondragend (source event), the final event to fire, occurs when the user releases the mouse in a drag operation, regardless of whether the source element is over a valid drop target.

Next, the Dragged Data is transferred. By using the window.event.dataTransfer object pre-defined clipboard functionalities can be accessed to assist us in our drag-and-drop operations. This makes it possible to customize dragging and dropping. The clearData( ) removes one or more data formats from the clipboard by means of the dataTransfer object. The effectAllowed specifies the effects allowed on the source element by the drag-and-drop operation.

The Drag and Drop Function(s) may include a variety of functions. These may include a copy command that copies the object selected. This is not merely copying as one thinks of copying, but actually, in the case of objects, creates a new object of the selected object, that is, instantiates the selected object. Another function may be to link the selected object to the drop target by the data transfer operation. There may be a move function that moves the selection to the target location when dropped. A copyLink function may be provided that copies or links the selection depending on target defaults. There may also be a copyMove function that copies or moves the selection, depending on the target defaults. Similarly, a linkMove function may be provided that links or moves the selection depending on target defaults. There may also be a function to turn all drop effects on and a function that disables the drop effects provided by the invention. In the latter case a no-drop cursor may be displayed to indicate that the drag and drop feature is disabled. There may be provided unitialized slots, where no function has been set, wherein the default effect will work but properties from this property cannot be queried. Of course, other functions are within the scope of the invention.

The present invention extends semantics for a drag and drop operation, which automatically, or by operation of a user, defines a new set of semantics that is applied when a drag and drop operation is executed. Now, the details of the drag and drop operation will be described in terms of programming code shown in the Appendix.

The dropEffect sets or retrieves the type of drag-and-drop operation and the cursor to display for the object. The syntax to call this operation is window.event.dataTransfer.dropEffect[=cursorStyle] where cursorStyle is a string that specifies the type of cursor displayed.

Possible cursor types could include a copy cursor displayed. A link cursor may also be displayed. A move cursor may be displayed. Further, a none cursor may be displayed which is the default value if no cursor is specified. In addition, a default cursor may be displayed which is the no-drop cursor. This last cursor may be, for example, formed of a circle with a slash through it.

Then, setData( ) assigns data in a specified format to the data Transfer object. The syntax for this method is window.event.dataTransfer.setData(sDataFormat, sData), where sDataFormat is a required string that specifies the format of the data to be transferred. It may either contain the value "Text" or "URL". The sData argument is another required string that specifies the data supplied by the source element. It may either be descriptive text or a URL of some sort.

The getData( ) event retrieves the data in the specified format from the clipboard through the dataTransfer object. The syntax for this method is: window.event.dataTransfer.getData(sDataFormat), where sDataFormat is required and is a string specifying either the data format value "Text" or "URL".

The present invention may be employed in the context of a Framework. A Framework is a software system, or subsystem that is intended to be instantiated. The instantiation of a framework involves composing and sub-classing the existing classes. A Framework for applications in a specific domain is called an application framework. It defines the architecture for a family of systems or sub-systems and provides the basic building blocks to create them and the places where adaptations for specific functionality should be made. In an object-oriented environment a framework consists of abstract and concrete classes. The Framework in the context of the present invention is not limited to an Industrial Framework, but may include other Frameworks, such as Telecommunications, ERP, Billing, etc.

Figure 4A:
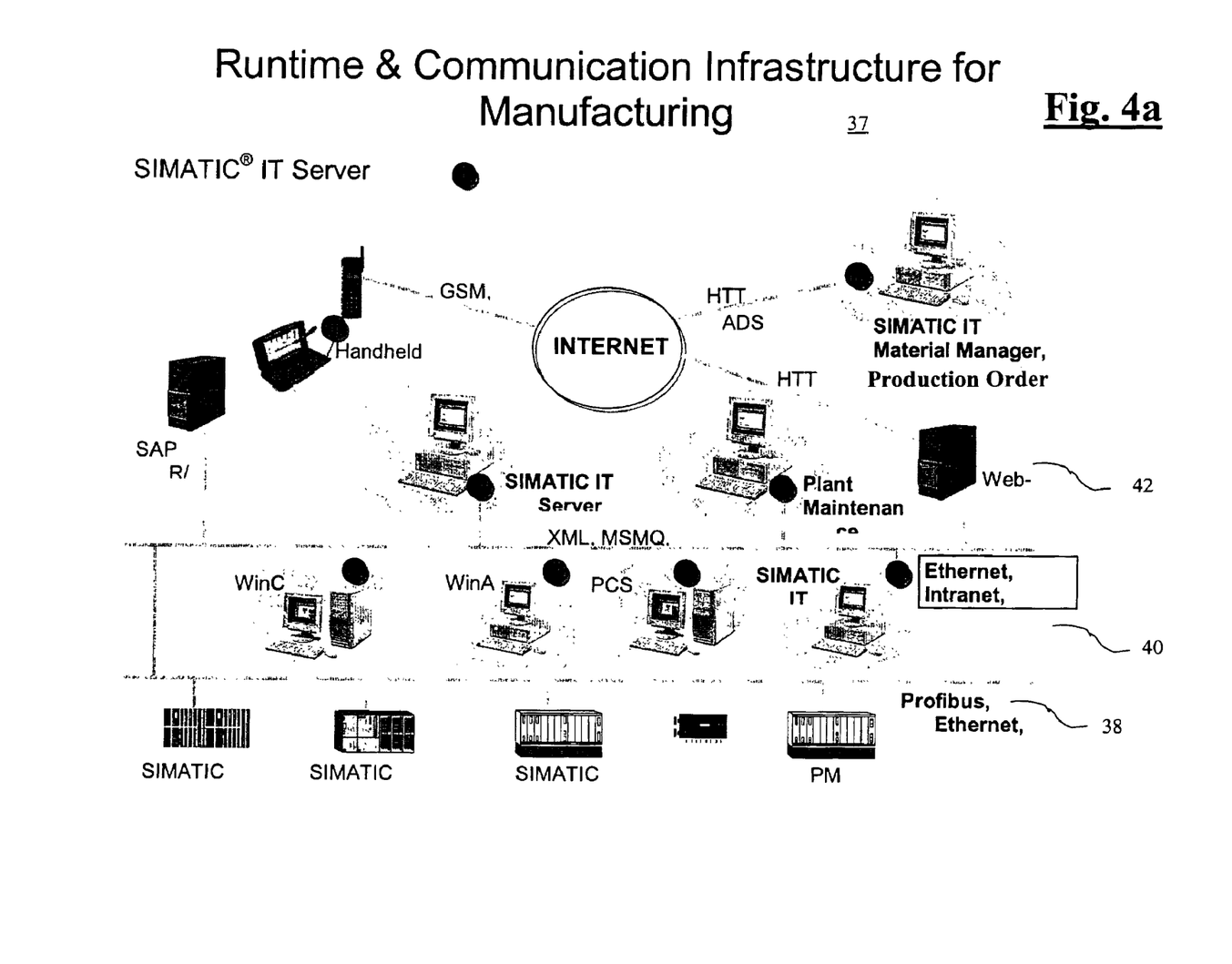
FIG. 4a is a schematic diagram illustrating an architecture applicable to the present invention.

FIG. 4a exemplifies a type of Framework, the Industrial Framework 37, in which the invention operates. The Industrial Framework is a collection of highly-integrated components designed to integrate the systems within a factory. It is the fundamental technology providing the integration and coordination of the components which make up a manufacturing execution system (MES). The Industrial Framework implements and manages data communications between different functional components and allows the user to model the way in which these components work together to achieve manufacturing goals.

The Industrial Framework shown includes a Server layer 38 that forms the backbone of the network as it provides the common connection and integration of all systems coupled thereto and controls the flow of communication. The application layer 40 includes the various systems that control factory equipment coupled to the Industrial Framework. The presentation layer 42 provides the connection to the User(s) via remote systems, including HMIs, Cell Phones, Handhelds and PCs, for example.

As will be appreciated from FIG. 4a, the Industrial Framework of the present invention provides a flexible architecture which is scalable, distributed and open, providing a true n-level architecture. It will also be seen from the Figures that the Framework has multiple data transports including HTTP and MS Message Queuing, which could support remote access and control, such as through the Internet or through GSM, UMTS, for example. From the Figure, it is shown that the Framework supports both synchronous and asynchronous communication, thereby equipped to integrate any system.

From the architecture it will be observed that the Industrial Framework is designed to be expandable, dynamically configurable and reusable. As already noted, monitoring and controlling such a network is important. In order to facilitate this task, given the complexity of such Industrial Networks, the present invention provides support of HMI or GUI devices within Industrial Networks, such as the Industrial Framework. This lends declarative and graphical methods of modeling and makes possible the execution of network-wide information flows.

Figure 4B:
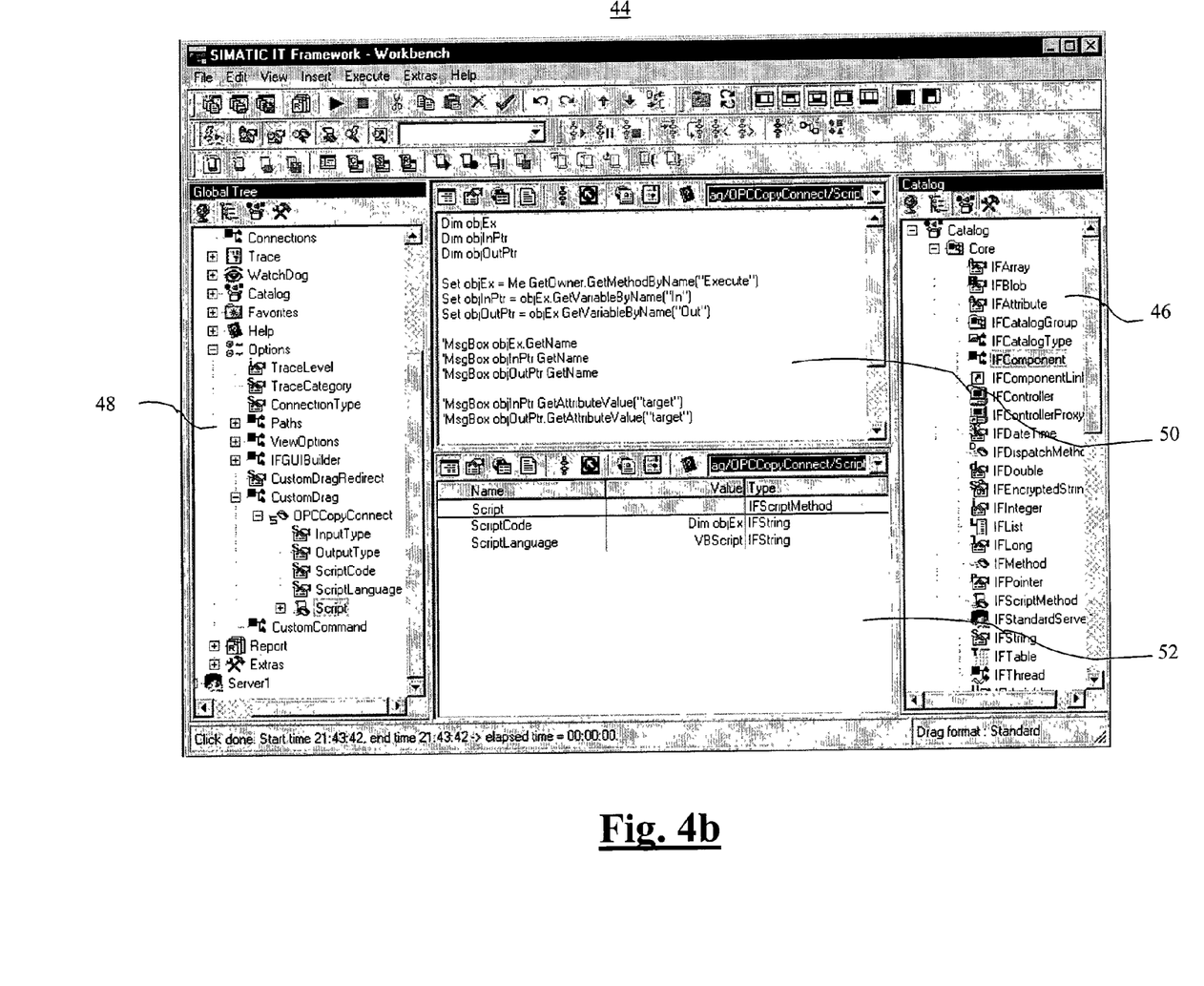
FIG. 4b is a screen shot illustrating the result of a Drag & Drop Operation.

Within the context of the Industrial Framework, there is provided (as shown in FIG. 4b) a special GUI, called a Workbench 44, which provides a graphical configuration, or a Workspace 46, in which distributed workflows and/or data flows as well as the design of business objects, mappings and project deployments can be designed and modified. It also provides for the design of business objects and the design of runtime GUIs. With the Workbench, the user is able to create user-defined, or project-specific custom drag commands realized as scripts which are edited, saved & loaded as part of the project-file or user-profile.

Providing an overview, or mapping, of the Industrial System, there is provided a Navigation, or Tree Pane 48, displaying an hierarchical tree directory of the system components of the Industrial Network. In the invention, the Tree can be of various types, including a Global Tree, which displays the Global System Components of the Industrial Network. There may also be provided a Local Tree within the Tree Pane, which displays Local Hierarchies. Further, there may be provided a Catalog Tree in another Tree Pane 50, which graphically displays a Hierarchy of, for example, an Adapter of the Industrial Framework.

Additionally, there is provided a Tools Interface Pane 52, that displays an interactive graphical set of commands. These commands may be, for example, common commands, such as opening files, saving files, creating new projects, activating/deactivating projects, exiting, shutting down and help and debugging information, such as manual literature and support. Thus, the Workbench provides an Integrated Engineering Environment in which a graphical configuration of distributed workflows and data flows are visually monitored and controlled.

A number of functions can be executed using the Workbench tools provided by the present invention. Configuration and integration of Adapters for Data Flows, for example, OPC to SAP connection. Definition and testing of State Machine Diagrams, with debugging support such as a single step, is provided by these tools. Using these tools, the GUI Designer may be used to graphically engineer HTML-based thin Clients. Adapters provide the Industrial Framework Server with access to all the data available within the distributed system. There is also provided a web-based GUI that delivers any part of this data to the web, and, with Active Server Pages, enable the remote control of Industrial Framework components.

With the Workbench described, it will be appreciated that the present invention can initiate Drag & Drop Functionality on the objects in the Tree Panes. For example, the present invention can cut and paste Function(s) between Objects. In addition, extended functionality can affect a Function on any selected object using the Drag & Drop extended functions. As shown in FIG. 3, the Drag & Drop Operation is executed to perform a Set Link Target on the Object, Component 2.

It will be appreciated that the present invention is advantageous because it provides a flexible tool by which the user easily and quickly can use several different functions in the context of two related objects. As new functions can be added at runtime to the drag and drop mechanism functionality can be applied to objects without requiring the user to rewrite software code or modify or adapt existing objects. This is particularly advantageous in complex Networks, such as an Industrial Framework, where numerous systems are in operation, requiring quick and efficient solutions. The present invention, in addition, provides a superior method by which the new functionality can be applied without leaving the GUI environment.

In addition to the embodiments of the aspects of the present invention described above, those of skill in the art will be able to arrive at a variety of other arrangements and steps which, if not explicitly described in this document, nevertheless embody the principles of the invention and fall within the scope of the appended claims. For example, the ordering of method steps is not necessarily fixed, but may be capable of being modified without departing from the scope and spirit of the present invention.

APPENDIX

```
<html>
<head>
<title>Shopping Anyone?</title>
<script language="JScript"><!--
// the object that you are dragging:
var srcObj = new Object;
// string to hold source of object being dragged:
var dummyObj;
function startDrag( ){
    // get what is being dragged:
    srcObj = window.event.srcElement;
    // store the source of the object into a string acting as a dummy object
so we don't ruin the original object:
    dummyObj = srcObj.outerHTML;
    // post the data for Windows:
    var dragData = window.event.dataTransfer;
    // set the type of data for the clipboard:
    drag Data.setData('Text', window.event.srcElement.src);
    // allow only dragging that involves moving the object:
    dragData.effectAllowed = 'linkMove';
    // use the special 'move' cursor when dragging:
    dragData.dropEffect = 'move';
}
function enterDrag( ) {
    // allow target object to read clipboard:
    window.event.dataTransfer.getData('Text');
}
```

APPENDIX-continued

```
function end Drag( ) {
    // when done remove clipboard data
    window.event.dataTransfer.clearData( );
}
function overDrag( ) {
    // tell onOverDrag handler not to do anything:
    window.event.returnValue = false;
}
function drop( ) {
    // eliminate default action of ondrop so we can customize:
    window.event.returnValue = false;
    // manually add new attributes:
    dummyObj = addAttribute(dummyObj, 'height="25" width="25"
alt'" + srcObj.myLabel + " ");
    // add the picture below shopping cart:
    miniProductBar.innerHTML += dummyObj + ' ';
    // change shopping cart message:
    productBarStatus.innerHTML = '<b>' + srcObj.myLabel + '<Vb>
has been added to the shopping cart.';
}
// since we aren't working with an actual object, we will add our attributes
manually:
function addAttribute(oObj, sVal) {
    var loc = oObj.indexOf(">");
    return oObj.substring(O, loc) + ' ' + sVal + '>';
}
//--></script>
</head>
<body>
<!-----------------DRAG THESE IMAGES-------------------------->
<p align="right">
<img src="jsbible.gif" ondragstart="startDrag( )" ondragend=
"endDrag( )" myLabel="Java Script SuperBible" border="1">
<img src="dhtml.gif" ondragstart="startDrag( )" ondragend="endDrag( )"
myLabel="Dynamic HTML" border="1">
<img src="html.gif" ondragstart="startDrag( )" ondragend="endDrag( )"
myLabel="HTML 4 Super Bible" border="1">
</p>
<!---------------------------------CART----------------------------->
<img src="cart.jpg" id="cart" ondrop="drop( )" ondragover=
"overDrag( )" ondragenter="enterDrag( )">
<!---------------------------------PRODUCT BAR STATUS------------------->
<div id="productBarStatus" style="font-family:arial; font-size:9pt">Drag
Items Into Shopping Cart. Works in IE 5.0 only.</div>
<!---------------------------------MINI PRODUCT BAR-------------------->
<div id="miniProductBar" style="width:400px; height:100px;"></div>
</body>
<html>
```

The invention claimed is:

1. An apparatus to select and activate user defined or project specific functions via an extensible drag and drop operation, comprising:

a user interface in which objects of a particular module are displayed graphically and selected graphically; and an extensible drag and drop in which a user drags a selected source object and drops it to a target object and which adds application and user specific functions including an extended function to be applied to the source object and to the target object upon drop, wherein the extended function defines a relationship between a target and a source object, wherein the user specific function to be activated upon drop is selected graphically via a menu which pops up upon dropping of the object.

wherein the extended function establishes a communication protocol between the source and target.

2. The apparatus of claim 1, wherein the extended function includes a set link target function which establishes a link between the source and the target object.

3. The apparatus of claim 1, wherein the extended function includes an add to deployment function which adds the source object, to the model which describes the deployment of the industrial system software to PCs, Workstations and PLCs.

4. The apparatus of claim 1, wherein the user interface is a workbench, wherein the user graphically interfaces with objects graphically represented.

5. The apparatus of claim 4, wherein the workbench includes a navigation pane that lists applications and associated objects in an hierarchical tree.

6. The apparatus of claim 5, further comprising a Framework, wherein the user workbench interfaces to the Framework.

7. The apparatus of claim 6, wherein the Framework is an Industrial Framework.

8. A method of establishing communication using an extended graphical user interface function comprising the steps of:

selecting a source object in said extended graphical user interface;

dragging said selected source object within said extended graphical user interface, dropping said selected source object to a target object within said extended graphical user interface to cause application and user specific functions including an extended function to be applied to the source object and to the target object upon drop;

wherein upon dropping of said selected source object to said target object within said extended graphical user interface, a pop-up menu is displayed showing at least one extended functionality; and selecting a function from said pop-up menu, wherein the extended functionality defines a relationship between a target and a source object;

wherein the relationship establishes a communication protocol between the source and target.

9. The method of claim 8, wherein activation of the extended functionality executes an object code program.

10. The method of claim 8, wherein the extended functionality includes a set link target function.

11. The method of claim 8, wherein the extended functionality includes an add to deployment function.

12. The method of claim 8, further comprising the step of coupling to a Framework.

13. The method of claim 12, wherein the extended functionality establishes a communication between servers of the Framework.

14. A computer readable project including computer readable code that drives a computer in accordance with the step of claim 8.

* * * * *